(12) United States Patent
Rawlings et al.

(10) Patent No.: US 8,687,342 B2
(45) Date of Patent: Apr. 1, 2014

(54) METHOD OF SURFACE CHARGE DISTRIBUTION

(75) Inventors: Diane C. Rawlings, Bellevue, WA (US);
J. Scott Bauman, Fall City, WA (US)

(73) Assignee: The Boeing Company, Chicago, IL (US)

( * ) Notice: Subject to any disclaimer, the term of this patent is extended or adjusted under 35 U.S.C. 154(b) by 311 days.

(21) Appl. No.: 12/974,981

(22) Filed: Dec. 21, 2010

(65) Prior Publication Data

US 2011/0096455 A1  Apr. 28, 2011

Related U.S. Application Data

(63) Continuation of application No. 11/615,786, filed on Dec. 22, 2006, now Pat. No. 7,864,501, and a continuation-in-part of application No. 11/611,023, filed on Dec. 14, 2006, now Pat. No. 7,525,785.

(51) Int. Cl.
*H05F 3/00* (2006.01)
*H02H 1/00* (2006.01)
*H02H 1/04* (2006.01)
*H02H 3/22* (2006.01)
*H05F 3/02* (2006.01)

(52) U.S. Cl.
USPC .......................................... 361/218; 361/212

(58) Field of Classification Search
USPC ................... 361/220, 212, 216–218; 244/1 A
See application file for complete search history.

(56) References Cited

U.S. PATENT DOCUMENTS

| 3,989,984 | A |   | 11/1976 | Amason et al. |
| 4,308,568 | A |   | 12/1981 | Whewell |
| 4,590,535 | A | * | 5/1986 | Mang ............................ 361/318 |
| 2002/0081921 | A1 |   | 6/2002 | Vargo et al. |
| 2005/0150596 | A1 |   | 7/2005 | Vargo et al. |
| 2006/0051592 | A1 |   | 3/2006 | Rawlings et al. |
| 2006/0146473 | A1 |   | 7/2006 | Heidelbaugh et al. |
| 2008/0144249 | A1 |   | 6/2008 | Rawlings |

FOREIGN PATENT DOCUMENTS

| WO | WO0224383 | 3/2002 |
| WO | WO2008076851 | 6/2008 |

* cited by examiner

*Primary Examiner* — Rexford Barnie
*Assistant Examiner* — Christopher Clark
(74) *Attorney, Agent, or Firm* — Law Office of Charles W. Peterson, Jr.

(57) ABSTRACT

A lightning strike protection system for protecting composite structures, an improved lightning strike appliqué (LSA) for such a lightning strike protection system, and a method of protecting composite structures, such as an aircraft fuselage. The LSA is electrically connected to adjacent conductive surfaces, e.g., by a fuzz button or a wire bond inserted in the bottom of the LSA. An adjacent conductive surface may be another LSA, a lightning diverter overlay, or a current return network. Charge, e.g., from a lightning strike to the LSA, flows to the conductive layer through the electrical connector.

19 Claims, 6 Drawing Sheets

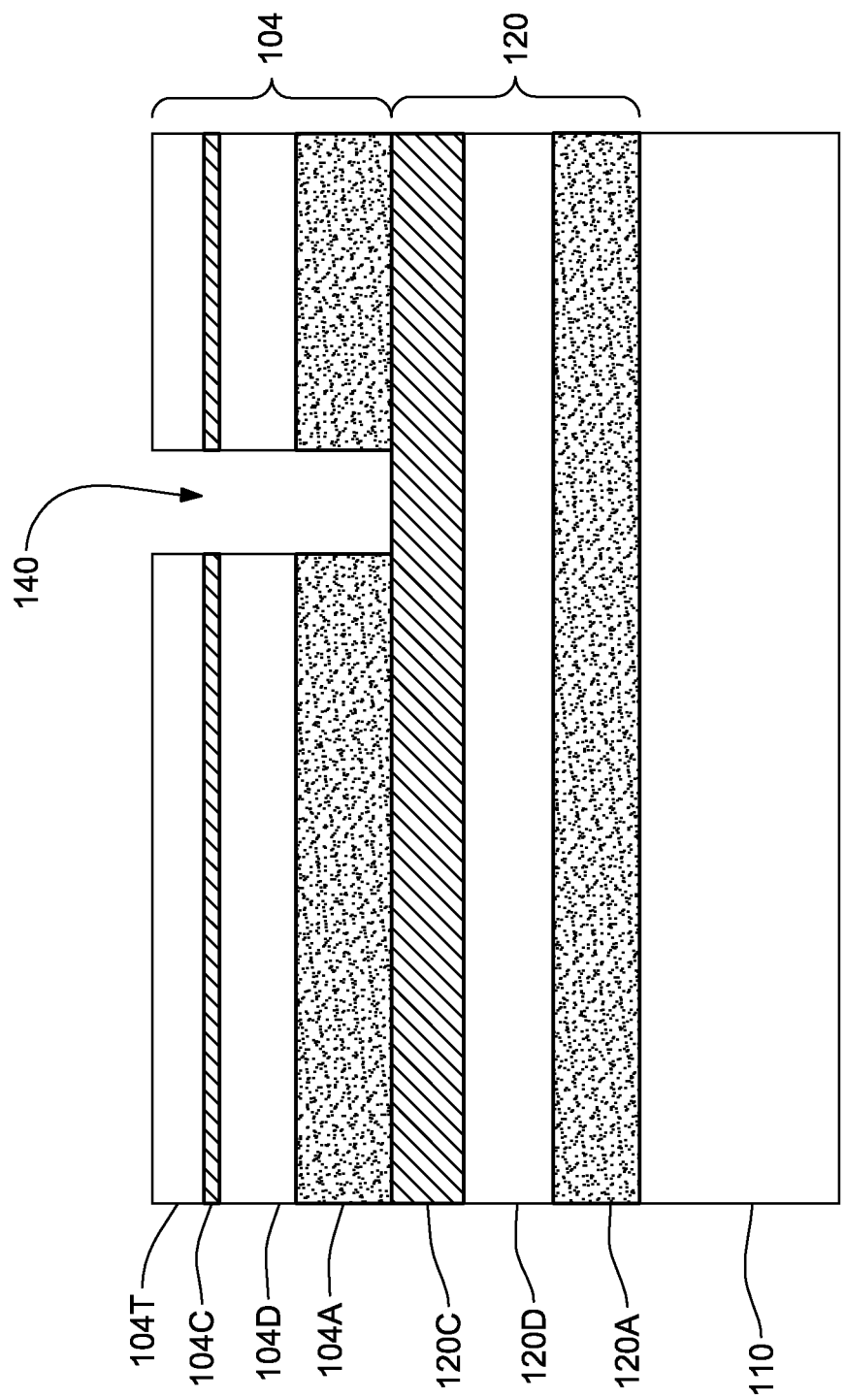

METHOD OF SURFACE CHARGE DISTRIBUTION

CROSS REFERENCE TO RELATED APPLICATION

The present application is a continuation of allowed U.S. patent application Ser. No. 11/615,786, Publication No. 2010/0134945, "Electrical Connects For Charge Distribution Appliqué," to Diane C. Rawlings et al., filed Dec. 22, 2006; a continuation in part of U.S. Pat. No. 7,525,785, "Lightning Strike Protection Method and Apparatus," to Diane C. Rawlings, filed Dec. 14, 2006 and issued Apr. 28, 2009; and is related to Published U.S. patent application Ser. No. 10/941, 429, Publication No. 2005/0181163, "Appliqué," filed Sep. 15, 2004 and published Aug. 18, 2005; and to allowed U.S. patent application Ser. No. 11/229,911, Publication No. 2006/051592, "Wide Area Lightning Diverter Overlay," filed Sep. 19, 2005 and published Mar. 9, 2006, both to Diane C. Rawlings et al., all assigned to the assignee of the present application.

BACKGROUND OF THE INVENTION

1. Field of the Invention

The present invention generally relates to protecting composite structures from lightning strikes, and more particularly, electrically connecting multiple conductive appliqués together in a continuous current path, for example, for establishing a preferred current path to ground along the areas protected by Lightning Strike Appliqué, or electrically connecting the appliqué to a ground contact for the purposes of preventing the buildup precipitation-static (p-static) charge on the aircraft surface or on underlying components.

2. Background Description

The ability to effectively manage lightning strikes on composite materials that form structural panels for wings, fuselages, fuel tanks, and other components of an aircraft structure is an important consideration for the safety of an aircraft.

Composite materials are highly desirable for use as structural components due to their lower mass, while possessing excellent structural rigidity and high strength. However, composite materials are not highly conductive and cannot dissipate the energy from a lightning strike as efficiently as traditional metal body components used in many conventional aircraft.

Carbon fiber reinforced plastic (CFRP) is one type of composite material used for skin, spar and rib installations on aircraft. A CFRP structure is about 2000 times more resistive than most metals, and consequently CFRP is more prone to electrical breakdown when subjected to currents from lightning strikes, especially at interfaces and fasteners.

Moreover, protection is needed against lightning strikes for not only composite skins and underlying structures, but for sensitive equipment, like hydraulic lines and fuel tanks, as well.

Appliqué coatings, such as Lightning Strike Appliqué (LSA), which contain a thin metal foil, and Wide Area Lightning Diverter Overlay (WALDO), are used to protect aircraft. These coatings are described in detail in US Patent Application 2006/0051592, which is incorporated herein by reference.

When using a lightning protection approach, such as LSA/WALDO, to protect the composite structure it is important to reliably transition the current that is carried by or on the appliqué coating system to a grounded metallic structural component or current return network.

Typical current return networks used on aircraft are buried inside the structure. This solution forces a designer to drive high electrical currents into the skin and composite structure itself. High currents damage sites at each electrical discontinuity, including fasteners, joints, fiber interfaces, panel edges, and the like, as well as creating hot spots, edge-glow or sparks, which, for example, could ignite the fuel within the wing box.

The difficulty of predicting where currents go once an aircraft is struck by lightning, leads to over-designing many areas of the structure and to the duplication of protection schemes.

BRIEF DESCRIPTION OF THE DRAWINGS

The foregoing and other objects, aspects and advantages will be better understood from the following detailed description of a preferred embodiment of the invention with reference to the drawings, in which:

FIG. 4 shows a cross section variation of a hole-type connection through the upper surface of the LSA gore to the underlying current return network.

DESCRIPTION OF PREFERRED EMBODIMENTS

Figure 1A:
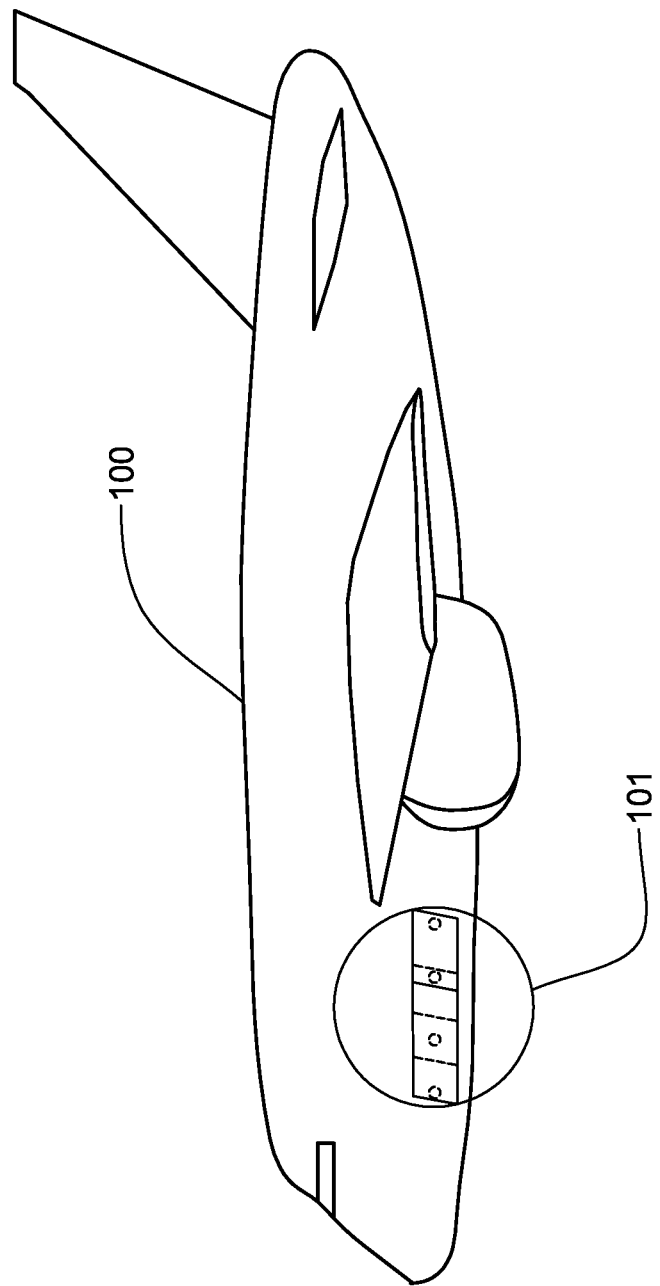
FIGS. 1A-B show an example of an aircraft protected by conductor with lightning strike appliqué (LSA) gores electrically attached and connected through a flexible, electrical connection, according to an embodiment of the present invention.
Figure 1B:
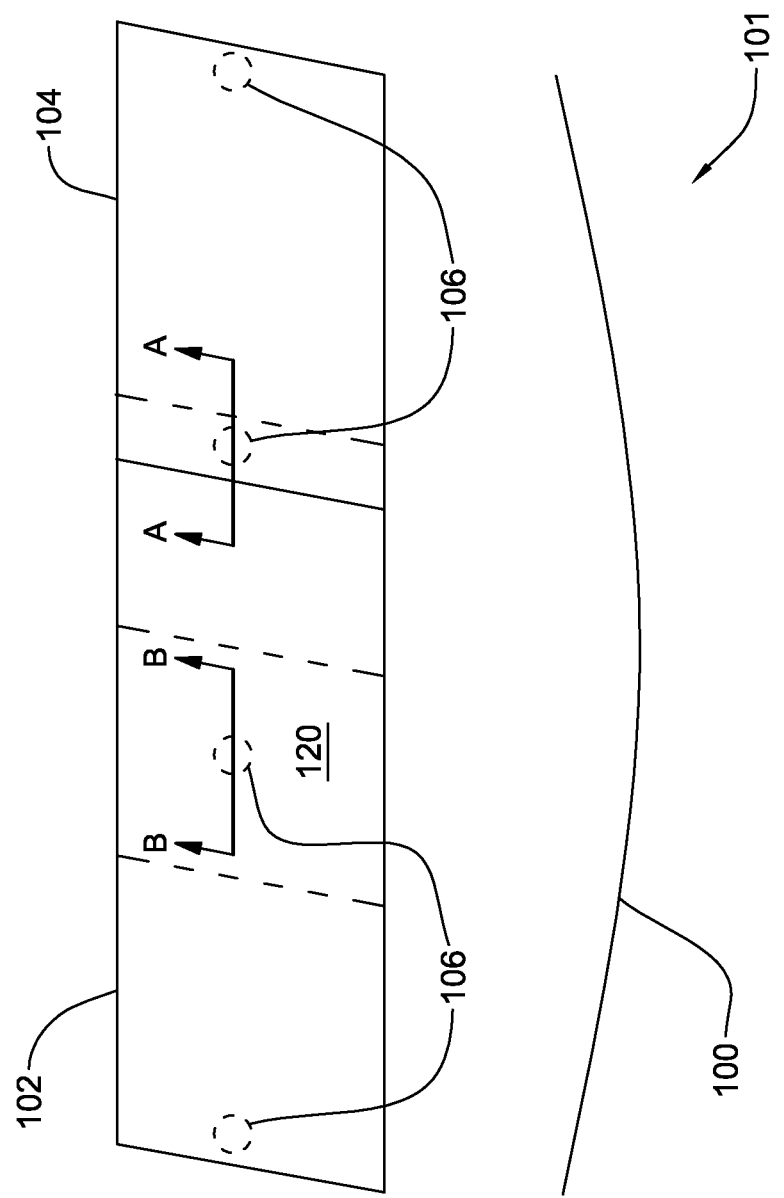

Turning now to the drawings and more particularly, FIGS. 1A-B show an example of an aircraft 100 protected by conductor 120 with lightning strike appliqué (LSA) gores 102, 104 electrically attached and connected through a flexible, electrical connection 106, according to an embodiment of the present invention. FIG. 1B is an expanded view of area 101 of FIG. 1A. Suitable LSA gores 102, 104 are described in Published U.S. patent application Ser. No. 10/941,429, filed Sep. 15, 2004, Publication No. 2005/0181163, entitled "Appliqué," published Aug. 18, 2005, to Diane C. Rawlings et al. (Rawlings I) and assigned to the assigned of the present invention. Furthermore, LSA gores 102, 104 may include a region of a Wide Area Lightning Diverter Overlay (WALDO). An example of a suitable WALDO is described in Published U.S. patent application Ser. No. 11/229,911, filed Sep. 19, 2005, Publication No. 2006/051592, entitled "Wide Area Lightning Diverter Overlay," published Mar. 9, 2006, to Diane C. Rawlings et al. (Rawlings II) and assigned to the assigned of the present invention. Regardless, however, preferred electrical connects 106 provide a reliable electrical connection between the underlying conductor 120 and LSA gores 102,104. Moreover, in combination with WALDO, the present invention provides a predictable distribution path for current that may result from a lightning strike.

Both the conductor 120 and the LSA gores 102, 104 in FIGS. 1A-B are manufactured typically as flexible flat multilayer laminates that are and readily bent and elongated typically in the range of 2-20% for easy application to a curved structure, e.g., an aircraft. Further, in this example, both the conductor 120 and LSA gores 102, 104 are adhesively attached to the aircraft composite skin. LSA gores 102, 104 typically include a polymer topcoat layer for protecting the conductive layer from environmental elements and that, optionally, may be painted. The flexible electrical connect 106 (preferably, contained subsurface to protect the connect 106 from environmental damage) may be one or mode wire bond loops, or one or more fuzz buttons inserted and connecting the pieces 104 to 102 and 120. Alternately, contact may be from above, passed through holes in the upper piece 104 to the lower 102, 120 or with conductive adhesive bridging the conductive layers. In this example, the LSA gore 104 conducts current, e.g., from a lightning strike, through the electrical connections 106 to the adjoining LSA and to the underlying conductor 120, which directs or dissipates current from the lightning strike discharge.

The electrical connection 106 may be made between two LSA gores, one overlapping the other, and between an LSA gore and an underlying ground path. Further, the size and shape of the LSA gores 102, 104, and underlying conductor 120 are determined by surface curvature or to minimize aerodynamic drag or for ease of installation, e.g., LSA gores 102, 104 on a wing may be trapezoidal. The conductor 120 may also be sized as an integral part of the design of the lightning protection system. Additionally, since the LSA gores 102, 104 may replace paint for economical static charge and lightning strike protection, the LSA gores 102, 104 may cover only a part or substantially all of the composite skin of aircraft 100.

Advantageously, a conductive LSA layer covering the composite skin of the aircraft 100 provides additional electromagnetic interference (EMI) shielding. For metal or composite skinned aircraft the LSA layer with electrical connects also provides EMI shielding preventing radiation leaking through holes, gaps, and joints. EMI shielding may also be provided for windows where the patterning of the foil in WALDO can form an inductive grid which enables the appliqué to be visibly transparent while remaining DC-conductive and connectable to LSA or other electrical ground.

Figure 2A:
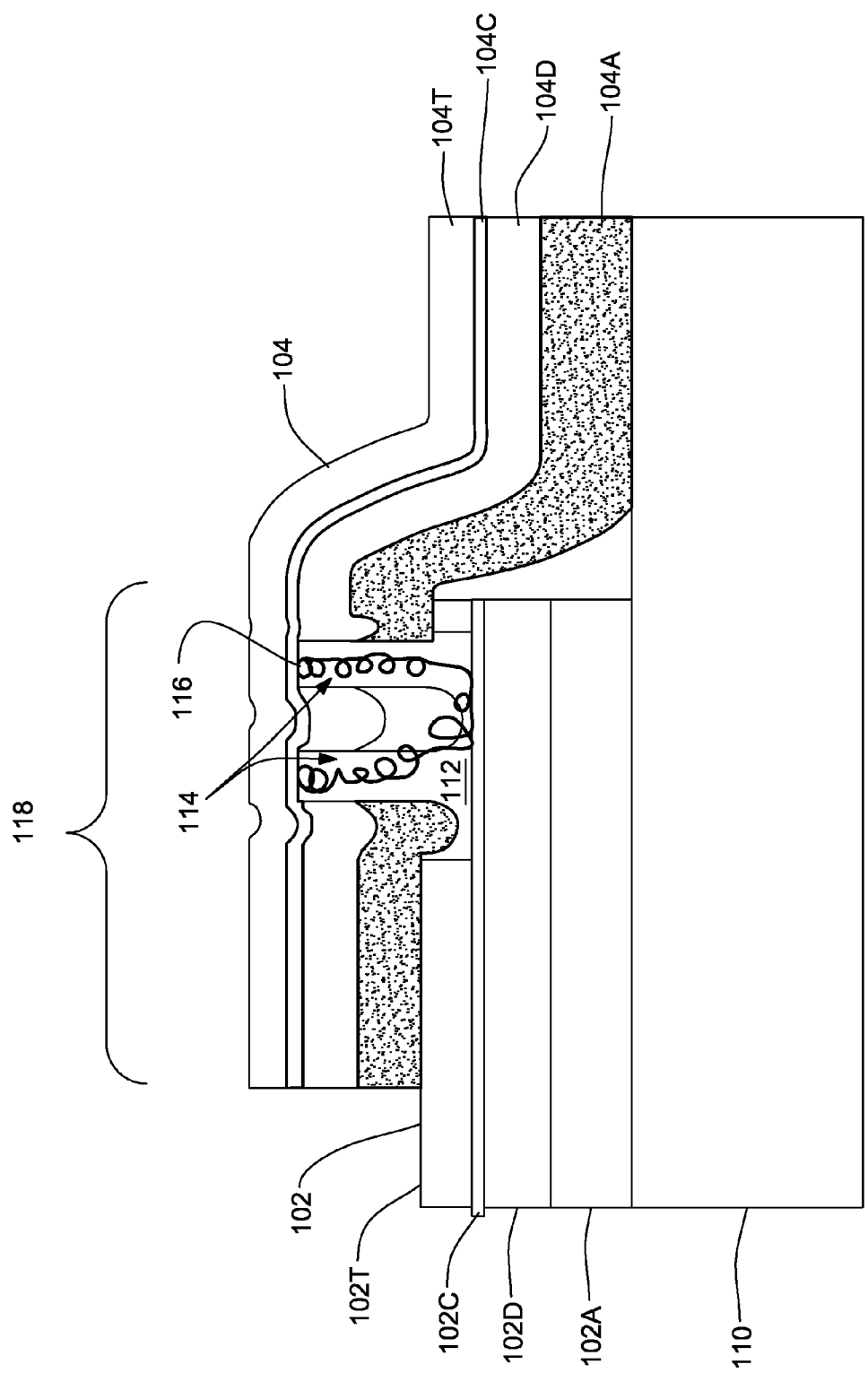
FIG. 2A shows a cross sectional example, wherein conductor is a LSA gore overlapped by another LSA gore with both adhesively attached to composite skin.

FIG. 2A shows a cross sectional example, wherein LSA gores 102, 104, both adhesively attached to composite skin 110, are electrically connected in a region of the overlap through A-A in FIG. 1B and substantially as described in Rawlings I. The LSA gores 102, 104 include a conductive layer 102C, 104C sandwiched in between a dielectric layer 102D, 104D and a topcoat 102T, 104T. Each LSA gore 102, 104 also includes an adhesive layer 102A, 104A, attaching the respective to the underlying composite skin 110 and, with LSA gore 104, LSA gore 102. The first LSA gore 102 is applied and attached directly to the composite skin 110. An area 112 is removed from the topcoat 102T of the first LSA gore 102, exposing the conductive layer 102C.

Preferably, the area 112 along the edge of the second LSA gore 104 (preferably 5-6 mm) from the edge is a small diameter annulus (<2-5 mm), where the dielectric layer 104D and the adhesive layer 104A have been removed leaving a small central region intact to hold a fuzz button connector. Vias 114 are large enough to allow one end of the electrical connect 116 (a fuzz button in this example) to contact the conductive layer 104C and may be annular or single circular holes. Similarly, a region in the topcoat of the first LSA gore 102T sized to accommodate ready contact of the fuzz button (preferably 7-10 mm in length and width) or is removed. Preferably, these vias are created using a laser scribed template, but may be created more arduously using standard chemical etch or mechanical means. Normally, fuzz buttons are used in semiconductor test sockets and interconnects where low-distortion transmission lines are a necessity. A typical fuzz button is fashioned from a single strand of wire, e.g., gold-plated beryllium copper wire.

In this example, the first LSA gore 102 is applied, e.g., pressed in place, and adhesively fixed to, the composite skin 110. The fuzz button connect 116, which is cylindrical but readily bent or doubled over into a U-shape as in this example, may be inserted in the second LSA gore 104 in vias 114 and, temporarily held in place by the adhesive layer 104A. Then, the second LSA gore 104 with the fuzz button 116 in place is applied to the composite skin 110 to overlap 118 the first LSA gore 102, preferably by 10-15 mm. Preferably, the extent of overlap 118 is minimized to minimize weight and cost, but also for aesthetics and in some cases to facilitate adhesion of the LSA gores 104. This may facilitate adhesion because, depending on the topcoat composition and texture, the adhesive may not adhere to the topcoat as well as to the aircraft surface. With the U-shaped fuzz button 116 held in place at the overlap 118 by the adhesively attached second LSA gore 104, the fuzz button 116 mechanically contacts both conductive layers 102C, 104C for a much improved electrical contact between the two.

Figure 2B:
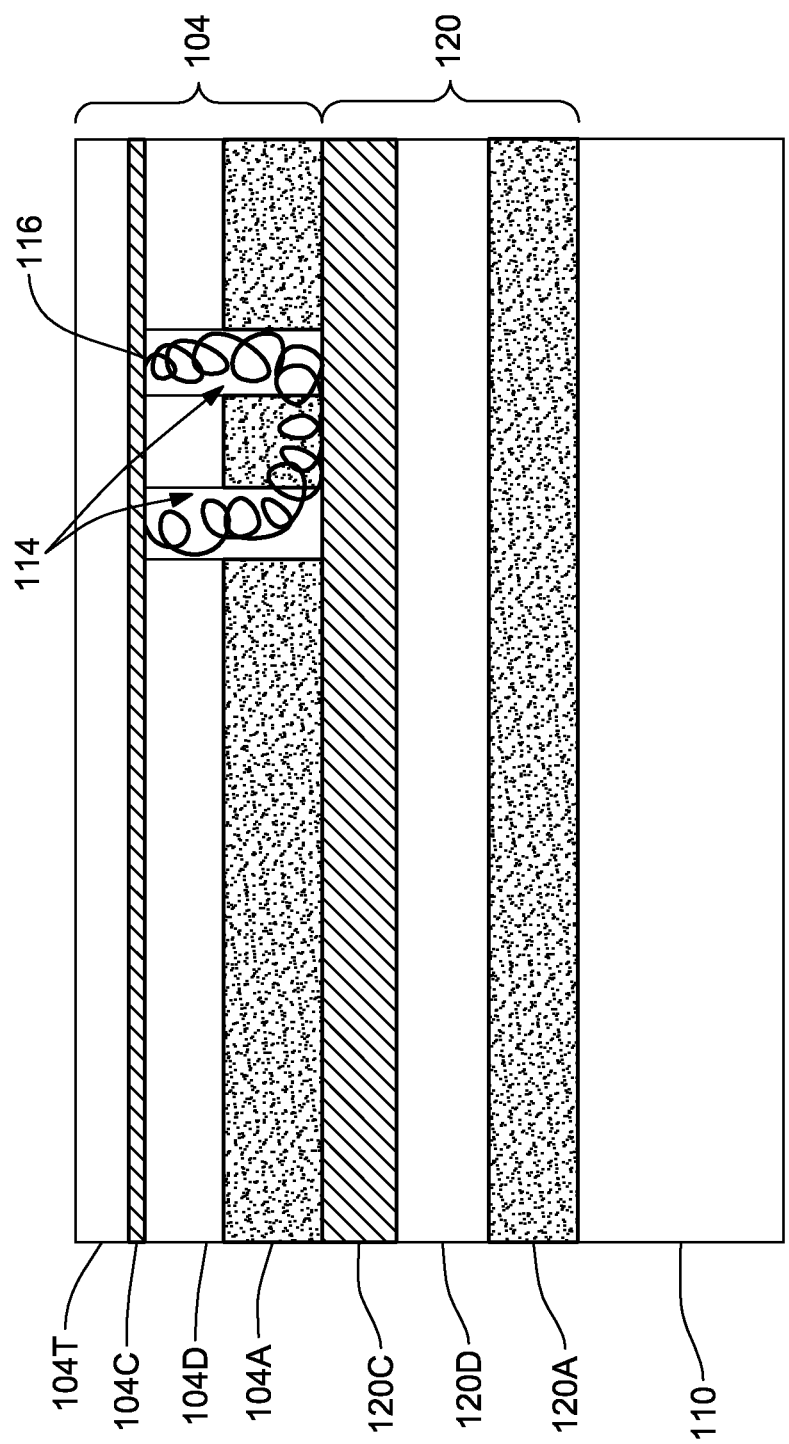
FIG. 2B shows a cross section of connection of a LSA gore to an underlying current return network.

FIG. 2B shows a cross section of a current return or ground connection layer 120 overlapped by and connected to LSA gore 104, e.g., through B-B in FIG. 1B. In this example, the LSA gore 104 is connected to a current return network 120 that is adhesively applied directly to the composite skin 110. The current return network 120 includes a conductive surface layer 120C on a dielectric isolation layer 120D and is attached to the composite skin 110 by an adhesive layer 120A at the dielectric isolation layer 120D. Typically the LSA gores 102, 104 and current return network 120 are manufactured as flat, flexible multilayer laminates of a conductor layer 102C, 104C, 120C, preferably a metal foil or mesh, on a dielectric film layer 102D, 104D, 120D of a suitable dielectric polymer and an adhesive attachment layer 102A, 104A, 120A. Unlike the LSA gores 102, 104, the current return network 120 typically does not have a topcoat 102T, 104T; instead, the conductive surface layer 120C is exposed.

Figure 3:
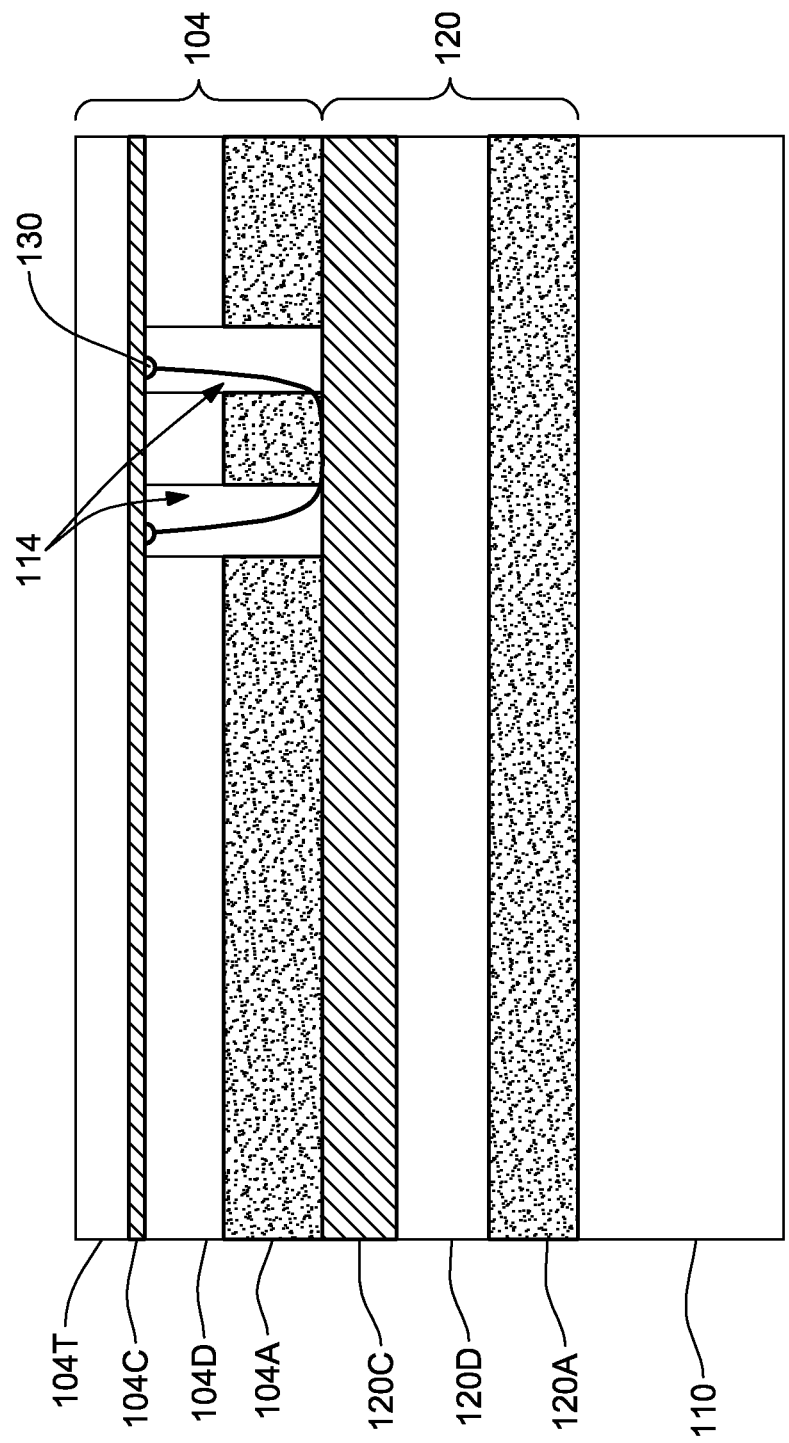
FIG. 3 shows a cross section variation of electrically connecting the LSA gore to the underlying current return network with wire bonds.

FIG. 3 shows a variation on the cross section of the ground connection layer overlapped by and connected to LSA gore 104 of FIG. 2B with like elements labeled identically. In this example, instead of a fuzz button, wires 130 are wired bonded to connect a location of the foil on LSA gore 104 to another location of the foil on LSA gore 104 and the wire loop makes contact with the underlying conductor 120C. Preferably, the wires 130 are 0.0005-0.001" (12.5-25 μm) in diameter and operate substantially the same as the fuzz buttons 116 with U-shaped wires bonded in the vias 114 to the second conductive layer 104C. When pressed in place, the wires 120 mechanically contact the first conductive layer 104, substantially the same as the fuzz buttons in the embodiment of FIG. 2A.

FIG. 4 shows another variation on the cross section of the ground connection layer overlapped by and connected to LSA gore 104 of FIG. 2B with like elements labeled identically. Although not DC-conductive, this connector is particularly effective for transitioning the current from a lightning strike traveling in a conductor such as LSA to the underlying conductor of the current return network. In this example, instead of forming subsurface contacts between the LSA gores 102, 104, holes or through-vias 140 are bored through top of the second LSA gore 104 to the conductive layer 120C, or for a LSA gore conductive layer, exposing the conductive layer in that LSA gore. Further, for a LSA gore conductive layer, an area of the topcoat of the LSA gore conductive layer may or may not be removed (substantially as described for area 112 in FIG. 2A) prior to attaching the second LSA gore 104. The through-vias 140 are opened to the LSA gore conductive layer at these areas 112. After opening through-vias 140 in LSA gore 104, a fuzz button or other connect may be inserted in the opened through-vias 140. For lightning protection the hole itself is an adequate conductor. For dissipating Precipitation-Static (P-Static) charge, for example, the through-vias 140 may be filled with a suitable electrical conductor such as an electrically conductive adhesive or sealant. Additionally, the holes may be covered with a suitable dielectric protective seal if desired.

Advantageously, substantially the entire surface area of a composite structure, such as a composite aircraft, may be covered with appliqués. The conductive layers and/or lightning diverter overlays distribute and dissipate current, such as from lightning strikes and thus, eliminate or, substantially mitigate any damage caused by lightning strikes. The interconnected appliqués are easy to install initially and, easy to repair. Because the surface applied appliqués, where applied, provide a substantially uniform conductive layer, most of the current from each lightning strike travels through the conductive appliqués rather than damaging the underlying composite.

In addition, the interconnected appliqués conductive layers and/or lightning diverter overlays can cover the entire surface or any selected portion thereof. The interconnected appliqués are relatively inexpensive, with lightweight electrically connected appliqués economically providing lightning and exterior static charge protection. Also, preferred appliqués may be used as a discharge straps between areas where static charge is known to collect, e.g., windows in the vicinity of high radio frequency (RF) transmissions. So, the electrical connects facilitate providing a deterministic scheme directing current from a lightning strike, even in the absence of a DC connection, e.g., appliqués with conductive through-vias. P-static charge can be distributed and dissipated through appliqué-to-appliqué or part-to-appliqué-to-part DC electrical connections.

Furthermore, interconnecting appliqués in a lightning protection system according to a preferred embodiment of the present invention simplifies design for static electricity discharge protection. The electrical connects are flexible and thermally expandable to maintain connection in a lightning protection system and without excessively increasing aircraft weight but with superior performance and protection. Because appliqués are electrically connected a low resistance continuous current path is provided to minimize static charge build up, e.g., on the exterior of an aircraft. Thus, static-originated current passes across appliqué gores, joints or seams. Further, preferred electrical connectors facilitate controlling the transition of lightning current (preferably, external to the skin of the aircraft), diverting current from appliqué gores to an underlying current return network.

Thus, advantageously, high voltage effects and current arising from a lightning strike may be prevented (or at least significantly attenuated) from penetrating the composite skin. Moreover, preferred electrical connectors and especially subsurface connectors are readily located in any desired location without impacting the visual aesthetics or environmental durability of the surface. Finally, the preferred electrical connectors and LSAs provide low cost and low weight electromagnetic interference (EMI) shielding for aircraft or containment boxes/vessels for sensitive electronics.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

We claim:

1. A method for preventing static charge buildup comprising:
   enabling charge to distribute across a first conductive appliqué affixed to a surface;
   passing charge to a conductor coupled to said first conductive appliqué; and
   directing the charge to a collection point in a second conductive appliqué affixed to said surface, wherein at least a portion of said first conductive appliqué overlaps said second conductive appliqué.

2. A method for preventing static charge buildup as in claim 1, wherein said second conductive appliqué is in a series of conductive appliqués including said first conductive appliqué and said second conductive appliqué, charge being distributed over said series of conductive appliqués.

3. A method for preventing static charge buildup as in claim 2, wherein said first conductive appliqué overlaps a portion of one or more other conductive appliqués, charge being distributed among said series of conductive appliqués at appliqué overlaps.

4. A method for preventing static charge buildup as in claim 3, further comprising passing charge from said first conductive appliqué to said second conductive appliqué and said other conductive appliqués through orifices through non-conductive layers to conductive layers in each conductive appliqué.

5. A method for preventing static charge buildup as in claim 4, wherein passing charge comprises passing current through conductors in said orifices attached to the overlapping said conductive appliqués.

6. A method for preventing static charge buildup as in claim 5, wherein said conductors are contained in said overlapping conductive appliqués and are selected from the group consisting of a fuzz button and one or more wire bonds.

7. A method for preventing static charge buildup as in claim 2, wherein said surface is a surface of a composite material structure.

8. A method for preventing static charge buildup as in claim 7, wherein said composite material structure is a composite aircraft.

9. A method for preventing static charge buildup as in claim 8, wherein said series of conductive appliqués provide electromagnetic interference (EMI) shielding to said composite aircraft.

10. A method for preventing static charge buildup as in claim 1, wherein said surface is a surface of an aircraft and said first conductive appliqué is a conductive strap passing charge over windows.

11. A method for preventing static charge buildup as in claim 1, wherein said surface is a surface of an aircraft and said first conductive appliqué is one of a plurality of conductive appliqués, each being a conductive strap passing charge over a respective aircraft seam or joint.

12. A method for preventing static charge buildup on an aircraft, said method comprising:
   distributing charge across each of a series of conductive appliqués affixed to a surface, one or more conductive appliqués overlapping other adjacent conductive appliqués;
   passing charge vertically between said conductive appliqués at appliqué overlaps; and directing accumulating charge from said series of conductive appliqués to a collection layer on a dielectric layer affixed to said surface, wherein at least a portion of said one of said series of conductive appliqués overlaps said collection layer.

13. A method for preventing static charge buildup on an aircraft as in claim 12, wherein said aircraft is a composite aircraft.

14. A method for preventing static charge buildup on a composite aircraft as in claim 13, wherein said series of conductive appliqués provide electromagnetic interference (EMI) shielding to said composite aircraft.

15. A method for preventing static charge buildup on a composite aircraft as in claim 14, said method further comprising passing charge from overlapping said conductive appliqués to said adjacent conductive appliqués through orifices through non-conductive layers to conductive layers in each conductive appliqué.

16. A method for preventing static charge buildup on a composite aircraft as in claim 15, wherein passing charge comprises passing current through conductors in said orifices attached to said overlapping conductive appliqués.

17. A method for preventing static charge buildup on a composite aircraft as in claim 16, wherein said conductors are contained in said overlapping conductive appliqués and are selected from the group consisting of a fuzz button and one or more wire bonds.

18. A method for preventing static charge buildup on an aircraft as in claim 13, further comprising passing current through conductive appliqués affixed over windows.

19. A method for preventing static charge buildup locally on an aircraft, said method comprising:
   distributing charge across each of a series of conductive appliqués affixed to the skin of an aircraft, charge passing through the conductive appliqués affixed over seams and joints;
   passing charge vertically through overlapping conductive appliqué edges; and directing accumulating charge to a collection layer on said skin.

* * * * *